United States Patent [19]

Roffelsen

[11] 4,381,928
[45] May 3, 1983

[54] APPARATUS FOR VENTING AND/OR DEGASSING A PIPELINE SYSTEM

[75] Inventor: Franciscus Roffelsen, Helmond, Netherlands

[73] Assignee: Spiro Research B.V., Helmond, Netherlands

[21] Appl. No.: 247,161

[22] Filed: Mar. 24, 1981

[30] Foreign Application Priority Data

Mar. 28, 1980 [DE] Fed. Rep. of Germany ....... 3012078

[51] Int. Cl.³ .............................................. B01D 19/00
[52] U.S. Cl. ..................................... 55/170; 137/202; 137/429
[58] Field of Search ................... 55/159, 170; 137/202, 137/429, 430

[56] References Cited

U.S. PATENT DOCUMENTS

| | | | |
|---|---|---|---|
| 495,059 | 4/1893 | Reasoner | 137/429 X |
| 1,119,980 | 12/1914 | Mulligan | 55/170 |
| 2,496,467 | 2/1950 | Griffith | 55/170 |
| 3,358,424 | 12/1967 | Magorien | 55/170 X |
| 3,362,137 | 1/1968 | Richards | 55/170 |
| 3,854,906 | 12/1974 | Roffelsen | 55/170 X |
| 4,027,691 | 6/1977 | Roffelsen | 137/202 |

FOREIGN PATENT DOCUMENTS 7136706  9/1971 Fed. Rep. of Germany .
7145993 12/1971 Fed. Rep. of Germany .
2200904  6/1978 Fed. Rep. of Germany .
308010   3/1929 United Kingdom ................. 55/170

Primary Examiner—Robert H. Spitzer
Attorney, Agent, or Firm—Toren, McGeady and Stanger

[57] ABSTRACT

An apparatus for venting and/or degassing a pipeline system includes an upwardly extending casing formed of a top part and a bottom part with a cap located within the casing and extending transversely of the upward direction in the region where the top part is connected to the bottom part. A valve is located in the upper end of the top part and has a horizontally extending valve needle projecting into the interior of the casing. A float needle is located within the top part of the casing and is in interengaged contact with the valve needle. A float is freely slidable on the float needle between the cap and the upper end of the casing. The top part of the casing and the float needle are dimensioned so that the float can move upwardly and downwardly on the float needle from the region of the cap toward the valve needle so that during a pressure increase within the casing up to a predetermined value there will be an accurate safety dimension maintained between the liquid surface in the casing and the valve. To prevent damage to or contamination of the valve, it is provided with a labyrinth outlet port.

39 Claims, 10 Drawing Figures

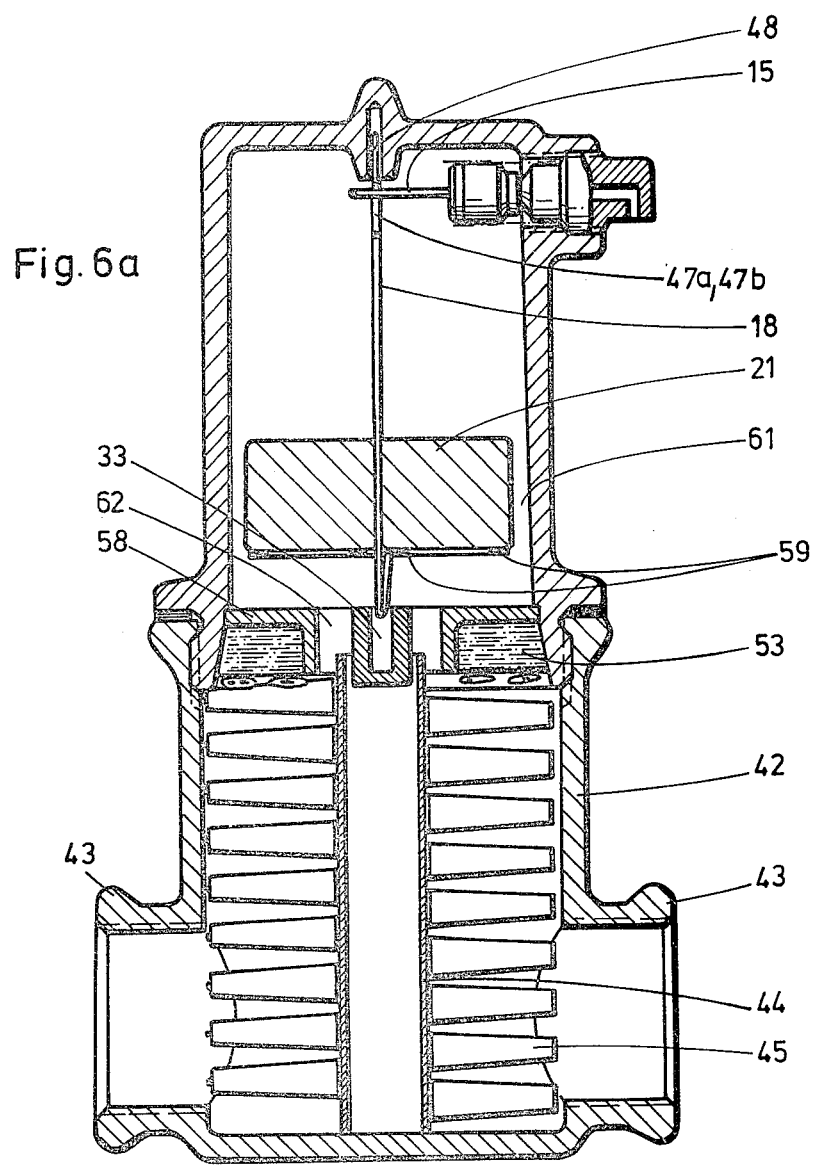

APPARATUS FOR VENTING AND/OR DEGASSING A PIPELINE SYSTEM

The invention relates to apparatus for venting and/or degassing, more particularly for the absorption degassing of pipeline systems with a liquid circuit, in particular a water circuit, with a casing the top end of which is provided with a valve having a needle adapted to project into the casing and a float with a float needle is vertically movably suspended from the valve needle.

In closed circulation systems such devices are provided to permit the necessary air exchange between the interior and the exterior when the system is filled and discharged and in the presence of thermally caused volumetric changes of the circulating water but they are also intended in closed systems as well as in open systems for collecting and separating air and other gases produced during operation, which have remained in the system or were liberated during operation and are entrained by the circulating water in the form of bubbles of varying size.

A device of this kind disclosed in the German Patent Specification No. 22 00 904 has a squat casing the height of which differs only slightly from its diameter. At its bottom end the casing is provided with a connecting socket for the pipeline system and is filled with circuit water to slightly above half its height while air is disposed in the remaining top part of the casing. Immediately beneath the casing lid, the side wall of the casing is provided with a valve from which a valve needle extends approximately to the perpendicular middle axis of the casing. A float with a perpendicular upright float needle, which is suspended from the valve needle and thus opens the valve if the water drops below a specific level, floats in the circuit water.

The distance between the water surface and the valve is comparatively slight so that no substantial rise of the water level can be permitted, since otherwise any impurities floating on the water could enter the valve which would thus tend to leak and therefore become unusable. This means that this known device, which in other respects operates satisfactorily, can be employed only in pipeline systems in which pressure fluctuations are comparatively slight. The height of the air bubble in the casing and the distance between the valve and the water surface are such that the air bubble can decrease only to half its original volume in order to avoid the risk of the ingress of dirt into the valve. This means that in cases involving contaminating constituents, the permissible pressure fluctuations may exceed the mean prevailing pressure only by less than 1 bar.

A valve disclosed by the German Gebrauchsmuster No. 71 36 706 is provided with a screw member which is connected by means of a prestressed spring to a float spindle. In this case, the screw member supports the valve seat and the float spindle supports a seal plate situated opposite the valve seat. An eccentric float is rotatably supported on the float spindle at the end thereof. As the water level rises, the eccentric float initially rotates about the float axis and with continued rising of the water level is raised, so that the valve is closed. Any further pressure increase causes the water level with the dirt disposed thereon to rise above the valve seal so that this comes into contact with the dirt and therefore tends to leak.

In a venting device disclosed by the German Gebrauchsmuster No. 71 45 993, a float is eccentrically supported in a vessel. An air exit port is provided in the lid of the vessel and functions simultaneously as valve seat and suspension point for a tension spring. When the water level has risen to immediately beneath the valve plate of the valve, the valve is closed by the float. With a further increase of pressure the water level also continues to rise so that the dirt which floats on the surface of the water is constantly in contact with the valve plate of the valve and the valve therefore tends to leak, i.e. it is unusable. As in many other technological fields, it is also true for the apparatus in question that in view of the available technological facilities it is no problem at the present time to construct an accurately functioning complicated instrument even with a theoretically long-term working life but in this case, as well as in most other technical fields, the risk of dirt ingress and consequent impairment of functioning represents a problem which has not yet been solved. It must be assumed that dirt is present everywhere and irrespective of the complexity of steps taken, it is hardly possible for completely dirt-free regions to be created. This is a particular difficulty for apparatus of the initially mentioned kind, since it is a requirement of the venting valve that it must be constantly ready for operation to ensure prolonged and uninterrupted venting; a venting device of the initially mentioned kind should therefore never have means for switching off, i.e. it must be constantly ready for operation.

It is therefore the object of the invention to construct a device of the initially mentioned kind and at the same time embody it so that it can be universally used, i.e. so that it can be used for water circuits other than those which are enclosed, that uninterrupted and reliable operation of the valve is guaranteed, irrespective of the presence of dirt, which in any case cannot be completely avoided, for a period of time which is limited by the high grade and therefore long life material of the valve itself; in particular, despite comparatively substantial pressure increases in the pipeline system, means should be provided to ensure that the valve does not come into contact with dirt which floats on the surface of the water but the construction of the valve shall nevertheless ensure easy installation and maintenance. The solution according to the invention is based on the idea that unintentional opening of the valve from the exterior as well as from the interior and resulting in a rise of the liquid level as far as the valve and therefore resulting in contact between the valves and the dirt film floating on the water is reliably rendered impossible both in the course of the normal operation as well as the result of incorrect operation.

The surprisingly simple solution, whose field of application is also versatile, as will be described hereinbelow, and the different possible embodiments of which are disclosed in the sub-claims, is initially achieved in that the float is disposed on the float needle so as to be vertically freely movable and the float needle and, where appropriate, the casing have a longitudinal dimension which is such that a sufficient safety distance remains between the water surface and the valve in the event of a pressure increase—up to a desired value. Proceeding from the above the invention proposes further steps with advantageous effects, details of which are disclosed hereinbelow, which steps render the apparatus according to the invention suitable for universal use so that by means of simple modifications it can be adapted under optimum conditions to prevailing conditions defined by pressure and temperature ratios or by the liquid.

The previously stated solution to the problem leads to a device in which the air bubble within the air chamber above the water level is so large that it can be compressed by pressure fluctuations to a fraction of its original volume, in the case of closed water circuits to 1/5 of its original volume without the risk of impurities or like solid matter, which floats on the water, being able to come into contact with the valve. This also means that pressure fluctuations in the pipeline system do not impair the ability of the apparatus constructed in accordance with the invention to operate. This is because the float is situated at a long distance, i.e. far below the valve. This ensures that no dirt is able to reach the valve so that a correspondingly long working life of the valve and therefore of the entire apparatus, constructed in accordance with the invention, can be expected. The vertical movability of the float on the float needle is essential for these properties, which are surprisingly achieved by the invention if the float needle has an adequate length. The free movability of the float on the float needle is also important in the light of continuous level fluctuations of the water level during operation due to changing temperatures and other influences.

Another embodiment of the invention provides that the valve needle and the float needle are connected to each other by their ends at means of eyelets. To this end it is advantageous if the eyelet of the valve needle extends in the horizontal plane and has the smallest possible diameter while the eyelet at the top end of the float needle should be constructed in elongated form.

A substantially constant lever arm through which the float force acts is ensured by the small diameter of the valve needle eyelet. Should the float adhere to the float needle, which is improbable owing to the constant motion of the float along the float needle, the top elongated eyelet of the float needle will thrust from below against the casing lid without exerting any force on the valve needle and occasionally even without touching the valve needle.

It is also possible for different eyelet embodiments to be provided. Within the scope of the invention it is possible for the eyelet, which is provided at the top end of the float needle, to be constructed as an open hook; in this case it is advisable to provide the top casing wall with a central indentation, oriented towards the float needle and acting as a stop abutment for the needle, for example in the previously-mentioned and exceptionally improbable case of the float adhering to the float needle. This embodiment substantially simplifies installation, since both needles can be engaged with each other in the desired manner merely by corresponding rotation about their longitudinal axis and without impairing their permanent operation.

Another simplification in coordinating the valve needle with the float needle in the installed state is obtained by a closed or open eyelet at the top end of the float needle being provided with an extension above the eyelet which is retained in a guide of the top casing wall so as to be longitudinally movable but with a restricted vertical movement and that the valve needle is rectilinearly stretched, i.e. is constructed without any hook or eye bends and in the installed state extends through the eyelet of the float needle. Embodiments of the float needle eyelet as used in preferred exemplified embodiments are disclosed in claims 8 and 9.

Advantageously, the bottom end of the float needle is bent into a stop abutment which defines the lowest possible position of the float in relation to the valve needle.

Also to facilitate assembly, the bent portion, provided as a preferred embodiment of the bottom stop abutment for the float on the needle is constructed in acute angled form and resiliently and therefore self arresting so that it is merely necessary during assembly to guide the float from below over the needle point, bent in this manner; after passing over the bent portion the needle point expands once again into an acute angle thus providing a self securing embodiment of the stop abutment which can, where appropriate, be easily dismounted.

Advantageously, the casing is provided with a bottom stop abutment and a top stop abutment for the float and the bottom stop abutment prevents overloading the spring of the valve and by virtue of the top stop abutment ensures that the float cannot exceed a specific height and therefore is reliably prevented from striking the valve.

The last-mentioned effect can also be achieved by a top stop abutment for the float on the float needle itself—more particularly in the form of a bulged portion or offset portion of the needle—in the other region thereof, more particularly beneath the eyelet, and in the event of the float bearing upon the said stop abutment any further rise of the liquid level merely results in the float needle eyelet striking the top casing lid, mentioned previously in connection with the exceptionally improbable adhesion, so that even then unintentional opening of the valve is not possible.

Another embodiment of the invention provides that the closing force of the valve can be steplessly adjusted by rotating a valve lid on a spring, so that the closing force can be optimally adapted to the prevailing conditions. Furthermore, the size of the sealing surface can also be adjusted by virtue of the adjustable prestress of the spring so that a larg sealing surface is obtained with a strongly prestressed spring while the sealing surface is correspondingly smaller if the spring is less heavily prestressed.

If the water level drops below the standard level at which the valve is relieved, the latter will not suddenly open but tilting of the valve lid with the seal covering in relation to the valve member will initially only result in a reduction of the width of the seal surface on one side and in a corresponding increase of the width of the seal surface on the other side until complete lift-off occurs on one side so that initial microventing changes to normal venting. Microventing describes a kind of air creep through the gap or the interface between the valve member and the mating member, i.e. the seal covering.

Advantageously, a labyrinth port, more paticularly one extending at right angles (corner port) extends through the valve member from the interior to the outside. This ensures that the valve cannot be opened or damaged by incorrect intervention from the exterior, for example by means of a needle or the like.

It is also advantageous to construct the float so that a water surface which can be large or small as desired, depending on the use, remains between the float and the internal wall of the casing so that on the one hand the float cannot be locked or adhere on the oppositely disposed casing wall due to dead deposits and on the other hand rising bubbles do not have any explosive effects.

In the interests of simplified assembling facilities as well as for the further improvement of permanent reliability of operation it is also proposed to construct the casing in a plurality of parts, the casing advantageously comprising a support member and a top member which are joined to each other by means of a gas-tight and liquid-tight screwed union.

By dividing the casing in two parts in the manner described a more comprehensive field of use is obtained, namely in that the support member, functioning as connecting member, is provided either only with a circuit connection or connecting socket which is advantageously provided in vertical-coaxial configuration in the bottom of the support member or in its function as connecting member and separator contains at least two circuit connections and a gas separating device. The top member as indenting device in both cases supports the valve and accommodates the float and float needle. In the first-mentioned case the apparatus is used advantageously as a large-scale venting device and as a pressure monitor (designated "Spirotop" by the applicant) while the second embodiment in its function as an adsorption degasser is designated by the applicant as "Spirovent" and these special terms will be used hereinafter in the interests of simplicity and are defined as follows:

The "Spirotop", which is to be mounted at the highest point of the system, ensures uninterrupted controlled maintenance of a minimum positive pressure at the highest place of the system, more particularly if the circuit is kept at a pressure level which is higher than that of atmosphere. For example, if there is a short fall of water in the circulating system, the water level is lowered and the drain valve is opened by means of the float. The pressure drop thus caused in the entire system then initiates shut-down via a pressure monitor, for example shut-down of the firing device of the heating system.

The "Spirotop" represents an ideal complement—the installation of a "Spirovent" which, as previously mentioned, contains a gas separating device in its support member. The separating device advantageously comprises a wire cage which has been found to be particularly reliable in the form of the so-called "Spirorohr". In a "Spirorohr" a wire barrier is applied spirally around the core tube; the wire cage must perform important functions in a particular manner. The wire barrier around the core tube is constructed so that it can hardly be calculated and detected in terms of a resistance to water but along the principal axis of the "Spirovent", extending perpendicularly to the flow direction, it creates a zone of absolute liquid flow smoothing so that even minute bubbles, which cannot be detected by the eye, including so-called microbubbles are able to rise in order to reach the top member in suitable manner in order to be discharged from there via the valve to the exterior. In this context and as regards the general operation reference should be made to the initially-mentioned German Patent Specification No. 22 00 904, such reference being confined exclusively to the principle of the bubble or microbubble separator while the scope of the present invention discloses not only a broader basis of use applying to different kinds of liquids and circuits for the first time and also discloses methods of construction to obtain optimum utilization of this effect within the framework of apparatus adapted to modern requirements of unlimited service life and operationality, at least with regard to the negative effect of dirt.

In this sense, the invention further proposes to adapt the individual components of "Spirovent" and "Spirotop" so that both differ merely by virtue of the connecting member while the head member is identically constructed in both cases and need therefore be manufactured and/or kept in stock only in accordance with the corresponding sizes.

A particularly advantageous step to this end is the arrangement of a separating and closing cap between the support member and top member and a further embodiment of the cap is sealingly and indetachably connected to the top member, more particularly by adhesive joining and has at least one connecting or liquid port and/or gas flow port.

This construction still further increases reliability in terms of the continued action of the apparatus according to the invention since a demountable screwed top with an adhesively joined lid, oriented to the support member is quasi provided and quasi leads to an encapsulation containing merely liquid and gas and more particularly air inlets. The top member is therefore identically constructed for the "Spirovent" as well as for the "Spirotop" with almost totally enclosed protection for the sensitively operating venting system which is disclosed in the top member. As already indicated, the top member can be used as a module component both for the "Spirotop" as well as for the "Spirovent". In this connection it should be pointed out that within the scope of the invention and in accordance with prevailing conditions caused by the particular kind of dirt ingress or by the medium in circulation, the dimensions of the top member, more particularly its length can be differently selected so that the degree of reliability against internal dirt ingress can also be adjusted by appropriate selection of the required amount of liquid free volume in the top member.

In order to further increase the accessibility in the sense of undesired intervention of the kind which is to be avoided by the above mentioned encapsulation, the invention proposes that the cap be provided with a central indentation which, in the installed state, projects downwardly into the support member and, where appropriate projects therefrom into the support tube of the "Spirorohr" and is constructed as a guide for the bottom float needle end.

This achieves guiding action which prevents oscillation of the float and in conjunction with the top needle suspension ensures the rectilinear float motion, thus obviating the need for the top casing stop for the float; it also prevents unintentional touching of the float needle from the outside or undesirable interference therewith.

Open ports are provided around the indentation, since gas or air and liquid exchange must take place in every case between the top member and the support member and the indentation itself can be either closed or open at the bottom.

Different embodiments of the cap itself are ideally suited for the creation of dirt collecting chambers in the support member so that pollution either does not reach the top member at all or at any rate only to a very small extent. The individual means for forming the cap as proposed by the invention are disclosed in the description hereinbelow and in detail by different subclaims. Encapsulation of the top member therefore also provides the means for detaching the liquid-tight and gastight screw connection between the top member and the connecting member and to remove the dirt collected in the support member or connecting member without the need for opening the top member and without impairing the reliable operation of the highly sensitive valve.

The parts associated with the valve mechanism consist of corrosion-resistant and temperature-resistant material.

Several embodiments of the invention will be explained hereinbelow by way of reference to the accompanying drawing in which:

FIG. 6a shows a preferred embodiment of a "Spirovent" the top of which is constructed substantially in accordance with FIG. 4 but is provided with a flat cap and with a float, provided from below with ring seals and shown as a cross-section;

Figure 1:
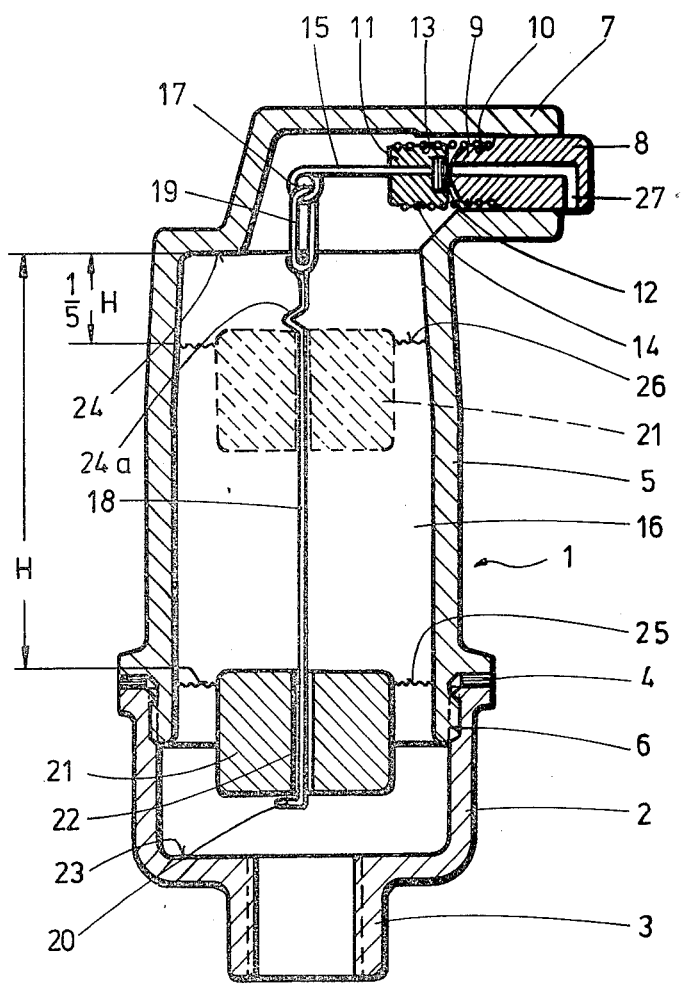
FIG. 1 is a device according to the invention shown as a cross-section and embodied as "Spirotop"

The apparatus embodied as "Spirotop" shown in FIG. 1 is provided for venting pipeline systems, not shown in detail, with a totally enclosed water circuit, for example of the kind employed for a central heating system of a building. The essential component is a vertical elongated casing 1 comprising a cup-shaped bottom part 2 with a connecting socket 3 for connection of the bottom part 2 to a pipeline system which is not shown in detail in the drawing.

A substantially cylindrically constructed top part 5 is screwmounted with the interposition of a gasket 4 upon female screwthreading 6 of the bottom part 2. At the top end of the top part 5 the latter extends into a socket 7, oriented perpendicularly to the longitudinal axis of the casing, to receive a valve member 8. The inner end of the valve member 8 has a diminishing taper 9 and is provided with male screwthreading 10 at that place.

A valve lid 11 with a seal covering 12, more particularly of Viton, is arranged opposite to the valve member 8 and coaxially therewith. The valve lid 11 is also provided with male screwthreading 13 which, together with the male screwthreading 10 of the valve member 8 represents a continuous screwthread. A helical spring 14 is screwmounted on to the male screwthreading 13 of the valve lid 11 and on to the male screwthreading 10 of the valve member 8. Screwmounting of the spring 14 to a greater or lesser extent on to the two male screwthreads 10 and 13 achieves corresponding prestressing of the spring 14 so that a corresponding closing pressure is obtained between the tapered portion 9 of the valve member 8 and the seal covering 12.

A valve needle 15 extends from the valve lid 11 approximately to the middle of an air chamber 16 which is defined by the head member 5. At the inner, free end, the valve needle 15 is provided with an eyelet, situated in a horizontal plane (by contrast to the drawing) and has the smallest possible diameter. A float needle 18 is suspended from the eyelet 17 by means of an elongated top eyelet 19. At the bottom end the float needle 18 is bent into a bottom stop abutment 20 for a float 21 which is freely movable on the float needle 18. The float 21 has a central bore 22 whose diameter is sufficiently large to ensure that the float 21 is able to move freely in the vertical direction in accordance with the prevailing level of the water surface between a bottom stop abutment 23 in the bottom part 2 and a top stop abutment 24 in the top part 5. The distance of the float 21 from the top member 5 and from the bottom member 2 is sufficiently large to prevent blockage or adhesion of the float and the adjacent walls due to pollution which floats on the water surface 25 or 26.

In a preferred embodiment, the function of the top stop abutment can be performed by a stop abutment 24a in the form of a lateral bulge or offset portion of the float needle 18.

A port 27, bent at right angles, is provided in the valve member to prevent the valve 8, 11, 12 being opened and/or damaged from the outside by means of a needle or the like.

If the device is disposed on a riser of a central heating system the float 21 will be situated in its bottom position while the heating system is being filled on being initially taken into operation, i.e. the float will bear on the bottom stop abutment 23 of the bottom member 2. The valve 8, 11, 12 will be opened via the float needle 18 and the valve needle 15. While the pipeline system is being flooded the air chamber 16 is vented by the valve 8, 11, 12. The venting process ceases at the moment at which the water level in the casing 1 raises the float 21 into the bottom position shown in solid lines, i.e. when the water level 25 is reached. The valve closes in this position. The pressure in the chamber 16 at that time is equal to the ambient pressure; positive pressure can be built up in the system from then onwards. It is only if a positive pressure of, for example, 6 bar is built up in the casing 16 that the float 21 in the illustrated exemplified embodiment will be in the top position shown in interrupted lines, i.e. the water level 26 shall have been reached. With each subsequent entry of air into the air chamber 16 the water level 25 will be lowered irrespective of the pressure which prevails at that time so that the float 21 also descends and the valve 8, 11, 12 is opened via the float needle 18 and the valve needle 15 if the water drops below the specified level. The valve will then be opened, i.e. venting is performed, until the float has again been raised into the bottom position shown in solid lines.

Adequate positive pressure can be built up in the air chamber 16 if the valve 8, 11, 12 is closed. During this operation the air in the chamber 16 will be compressed so that the water surface 25 or 26 and the float 21 move freely in the upward direction along the float needle 18.

The dimensions of the air chamber are selected so that a dirt film which floats on the water surface 25 or 26 is kept at a safe distance from the valve 8, 11, 12 in the presence of a pressure change of up to 5 bar. A pressure increase by 5 bar results in a reduction of the air bubble in the top member 5 to 1/5 of its original volume so that the water level 25 rises to the level 26 and thus entrains the float 21. Accordingly, the water level 25, originally at a distance H from the top stop abutment 24, approaches the latter to within a distance of 1/5 H.

The apparatus also functions as a safety device against a short fall of water. If an expansion vessel of central heating system, not shown in the drawing, has been emptied due to lack of water and said expansion vessel is unable to top up into the pipeline system, the water level 25 in the casing 1 will fall with an increasing water loss. The valve 8, 11, 12 will then open so that the positive pressure previously maintained in the casing 1 is reduced by, for example, 0.5 bar. Accordingly, the pressure in the entire pipeline system will also diminish by 0.5 bar so that a pressure switch, which is provided in the pipeline system but not shown in detail in the drawing, comes into action and either shuts down the burner of the boiler and/or simultaneously initiates topping up of fresh water.

Since the device shuts down before there is any short fall of circulating water in the pipeline system, it follows that the required positive pressure in the entire system is maintained so that any drawing in of air from the outside is reliably prevented. Corrosion and/or cavitation erosion no longer occurs in systems equipped with apparatus because of the reliable discharge of air or other gases.

These advantageous properties and characteristics can be utilized with particular advantage if the apparatus according to the invention is mounted as a "Spirotop" on a "dead branch" pipe section connected with the circulating system and having a water reserve or being adapted for water reserve—where possible several meters above the circulation system. At the moment of shut down as a result of water loss which is also evident in the venting casing, the pressure loss can be used inter alia for delivering a warning signal, for example for illuminating a signal lamp in the room thermostat so that imminent water short fall is signalled. The reserve water in the "dead branch" between the venting device and the circulating water functions quasi as a buffer and allows sufficient time for topping up while reliably avoiding the ingress of air into the system.

In the description hereinbelow of additional exemplified embodiments the same reference numerals were used for identical parts whose constructions substantially corresponds to that of the parts in the previously described embodiment.

Figure 2:
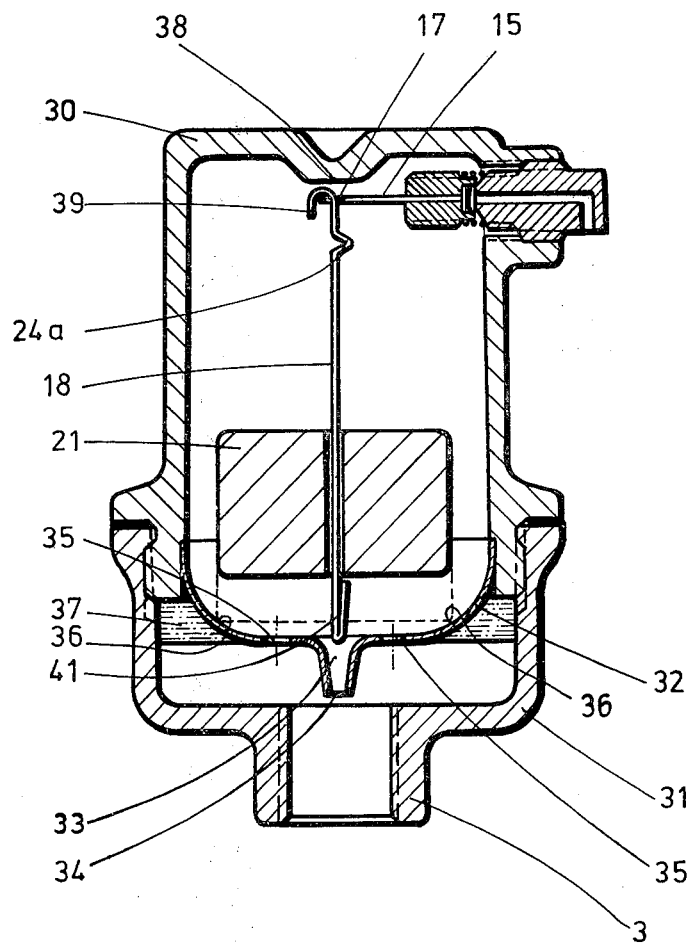
FIG. 2 shows an embodiment of the "Spirotop" according to the invention in accordance with FIG. 1 with an encapsulated top part, shown as a cross-section.

FIG. 2 also shows a "Spirotop" embodiment of the invention. This comprises the top member 30 with the valve installed at the top which will not be described in this exemplified embodiment and subsequent embodiments since its position as well as its construction corresponds to the embodiment according to FIG. 1, and the support member 31 which is constructed in cup shape as the bottom member 2 according to FIG. 1, is connected by means of screwthreading to the top member 30 and is provided at its bottom with the central, vertical connecting socket 3.

A cap 32 which functions as encapsulation of the top member 30 for protecting the highly sensitive valve and the float suspension, is disposed between the top member 30 and the support member 31. The cap 32 is fixedly connected to the top member more particularly, it is adhesively adjoined thereto at the bottom edge of the top member 30. In the illustrated exemplified embodiment, the cap is downwardly curved and has a central indentation 33 which is open at the bottom and shaped so that the bottom part of the float needle 18 is able to enter the indentation when it is in the lowered position; in the normal position the indentation also prevents the needle 18 from oscillating laterally. The indentation 33 therefore represents a kind of bottom guide for the float needle. The indentation 33 is downwardly open for the purpose of liquid exchange at 34 and is also surrounded by a plurality of open ports in the form of simple bores 35 which are provided in the cap 32.

The curved shape of the cap 32 achieves two desired effects. In the first place, the float 21 in its bottom position in which it opens the valve and which said position is shown in broken lines, the float 21 comes into point contact on a circle 36 with the circular cap 32, whose cross-section extends perpendicularly to the plane of the drawing, so that very slight lifting of the float is ensured with a rising liquid level owing to minimum adhesion; secondly, an annular dirt chamber 37 is formed in the arcuate region of the cap between the cap and the oppositely disposed wall part of the support member 31; dirt which floats on the liquid and is to enter the support member 31 through the connecting socket 3 can collect in the said dirt chamber 37 without penetrating into the head member 30.

Separated air is able to rise into the head member through the apertures 35 which are arranged in circular distribution about the indentation 33. The apertures 35 ensure that large air bubbles which enter the support member 31 are subdivided by contrast to the embodiment according to FIG. 1, before they enter the region of the float and valve; accordingly, the bubbles lose their relatively large buoyancy which could lead to real water explosion and entrained dirt particles are also prevented from being projected into the valve region with explosive force.

Large bubbles or a quantity of air which is able to trigger such a "water explosion" can pass only relatively slowly through the apertures 35 and furthermore must subsequently flow around the float 21 so that the abovedescribed dangerous flow effect in the upward direction is lost.

In the previously mentioned bottom position of the float 21, shown in broken lines, the valve is opened and the interior of the head member is separated from the interior of the support member by virtue of the float 21 bearing upon the cap 32. As soon as the system pressure again rises positive pressure will be produced in the support member 31 while the interior of the head member is connected to atmosphere. The pressure difference drives the float from its bottom position into the upward direction and in the event of sudden rising of pressure the stop abutment 24a prevents the float coming into contact with the valve member, i.e. the float is intercepted by the stop abutment 24a even in the event of an upward throwing motion.

Since the bottom end of the float needle 18 is retained in the indentation 33 against lateral deviation, it follows that by contrast to the embodiment according to FIG. 1 the float 21 does not require any top casing stop abutment.

Should the float 21 adhere to the float needle 18 despite all expectations, the needle 18 together with the float 21 will be raised in the event of a pressure rise and therefore a rise of the liquid level but only to a limited extent since according to the invention the top part of the head member, i.e. the top casing wall, has a central indentation 38 which is oriented towards the float needle 18 and functions as a needle stop abutment so that the valve needle 15 remains untouched by this movement of the float needle. At the top end the float needle is provided with an open eyelet 39 which engages with the valve needle eyelet 17 which is shown in its horizontal installed position. The open eyelet 39 permits simple and rapid installation of the float needle; assembling and dismantling of the float is also very simple and rapid since according to the invention the bottom end 41 of the float needle 18 is bent back at an acute angle so that it is merely necessary to insert the float 21 from the bottom over the end 41 which thereafter spreads slightly to provide a securing support for the float 21. As already mentioned, the bottom end 41 of the float needle 18 plunges by a small amount into the indentation so that in all circumstances the float can perform only vertical motions along a central axis and apart from touching the cap 32 touches no other parts of the device.

The above remarks indicate that the valve can open during operation only if the float descends below the illustrated position, at a maximum to the bottom position shown in broken lines, i.e. until it touches the cap 32.

If the valve needle is pulled down too far, for example if the float and float needle descend by an excessive distance, the spring 14 of the valve will be overstretched in some circumstances and this could lead to changed closing properties. In this respect, the cap 32 according to the invention offers substantial advantages since the indentation 33 functions not only as a bottom guide for the float needle 18 but also precludes any action on the needle in the sense that the lowest position, which the float needle 18 is able to reach, is defined by the lowest float position which in turn is defined by bearing upon the cap 32. The restoring force of the valve needle 14 ensures that when the float 21 bears on the cap 32 the float needle 18 cannot descend downwardly from the indentation 33 beyond the opening 34 thereof. In this position the bottom end 41 of the float needle 18 therefore remains within the indentation 33 so that no pull can be applied to the needle 18 even when the top member is removed, i.e. the maximum deflection and travel of the valve needle 15 is defined by the distance through which the float 21 traverses until it bears upon the cap 32.

Figure 3:
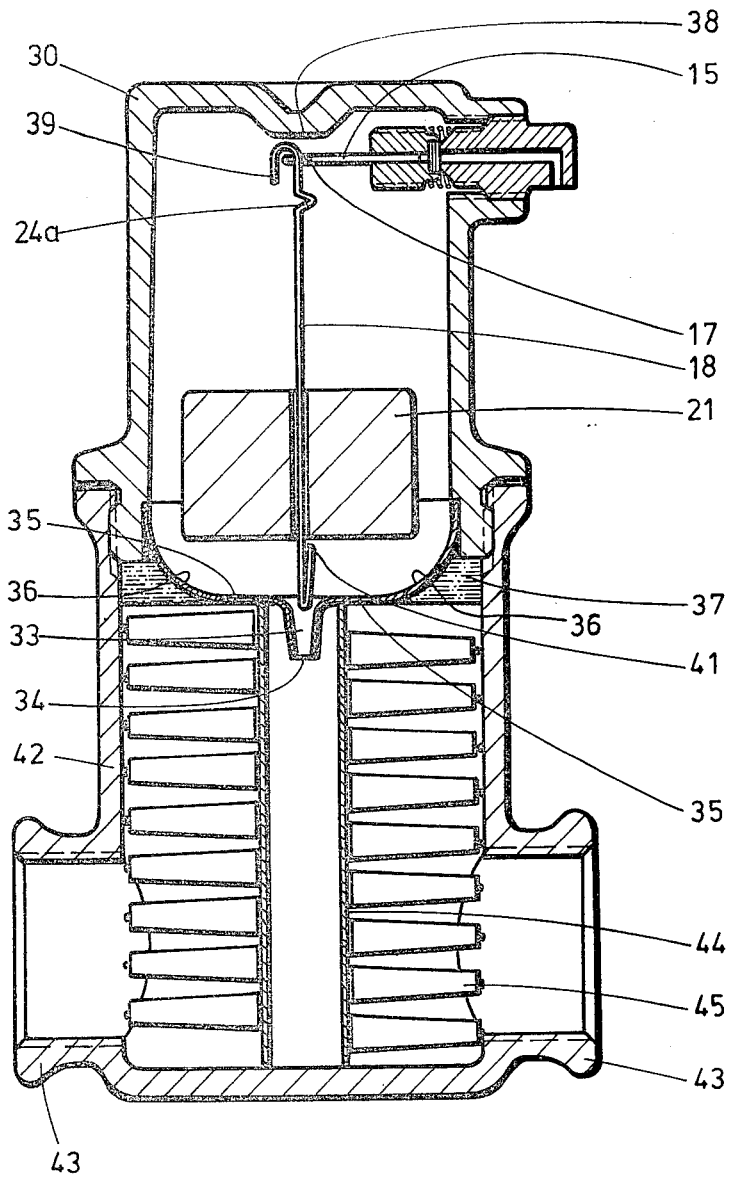
FIG. 3 shows another embodiment of the invention, in the form of a "Spirovent" at the top part with cap is constructed in the same manner as the embodiment according to FIG. 2.

The exemplified embodiment according to FIG. 3 differs from that described in accordance with FIG. 2 only in terms of the construction of the support member which in this case—being the "Spirovent"—is not constructed in cup form but longer and substantially cylindrical. In the bottom region the support member 42 of the "Spirovent" embodiment has two oppositely disposed connecting sockets 43 which are situated horizontally and coaxially in the installed state and whose aligned position is provided to enable the "Spirovent" to be inserted into a continuous pipeline. The support member contains the so-called "Spirorohr" the construction of which has already been explained and which substantially comprises the core tube 44 and the wire mesh 45 coiled thereon to ensure smoothing of the water in this region and rising of microbubbles into the top region of the support member 42 without offering any substantial flow resistance to the circulated medim which passes through the connecting sockets 43. Separated air or other gases which are to be removed pass from the top part of the support member 42 through the open ports or apertures 35 into the top member 30. The length of the "Spirorohr" is so dimensioned that the indentation 33 projects into the cope tube 44; furthermore, the apertures 35 extend outside the core tube 44 into the interior of the support member 42.

Figure 4:
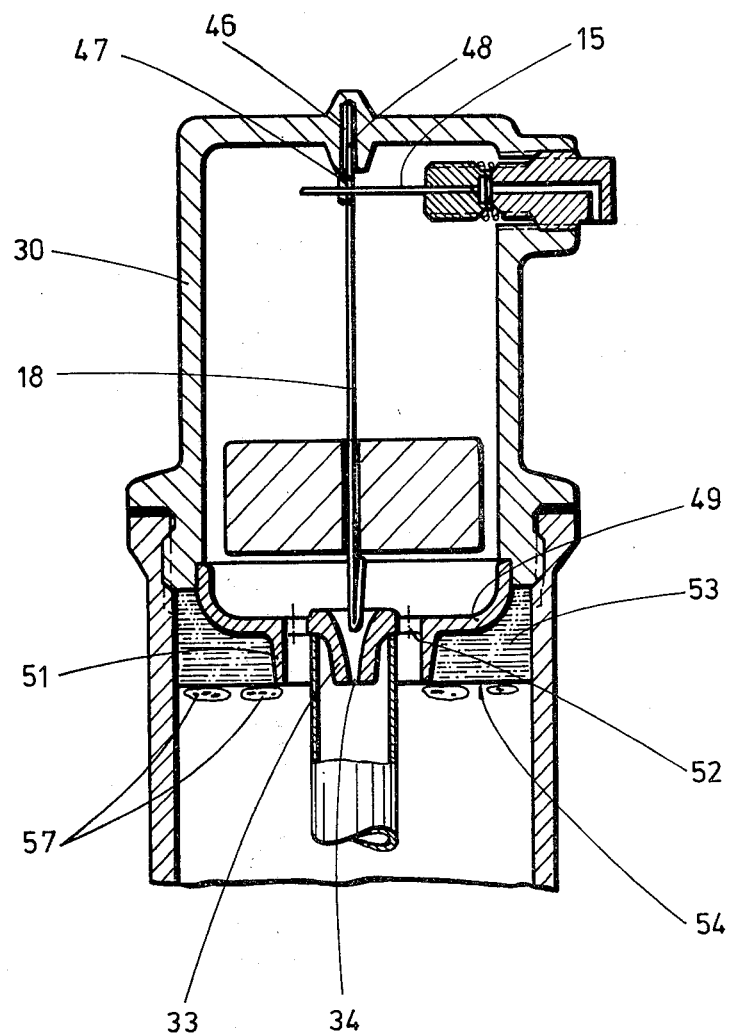
FIG. 4 is another modification of the top part and of the cap, also shown as a cross-section.

The top member 30 in FIG. 4 is shown on a support member which is only incompletely drawn and could be constructed either in accordance with FIG. 2 or in accordance with FIG. 3. The top member 30 therefore differs from that according to FIGS. 2 and 3 since a guide bore for the float needle with a differently constructed top part is provided in place of the indentation 38. Above the eyelet 47, which can be closed or open possible embodiments of which will be disclosed in connection with FIGS. 6c and 6d, the float needle has a rectilinear extension 48 which can slide longitudinally in the guide bore 46 to the top stop abutment. In this case, the valve needle 15 is straight without any bends or eyelets at the end. This provides a further assembling simplification without impairing the reliability and functionality of the valve, since the neutral engagement between the float needle 18 and the valve needle 15 continues to be ensured in the desired precise manner.

Another difference from the previously described exemplified embodiments is the shape of the cap mounted on the top member. The cap, designated "49" in the present exemplified embodiment, is so constructed that the connecting ports which surround the indentation 33 take the form of a deep-drawn collar 51 which surrounds an annular open aperture 52.

This construction of the cap produces a quasi permanent air chamber 53 in which dirt can collect and which is defined in the downward direction by the bottom edge of the collar 51. The air chamber 53 can be enlarged in desired manner by the appropriate shape of the cap. It has been found that a boundary film 54 is formed after some operating time between grease, dirt and water and small air bubbles can hardly penetrate through such a film. Owing to this phenomenon air bubbles accumulate beneath the boundary layer namely in the same plane in which the collar 51 of the open aperture 52 terminates and such bubbles can subsequently rise into the top member 30. In addition to increasing the size of the dirt collecting chamber and therefore increasing the effect of preventing the ingress of dirt into the top member 30, this embodiment of the cap 49 provides an additional positive effect for smooth rising of the air bubbles.

Figure 5A:
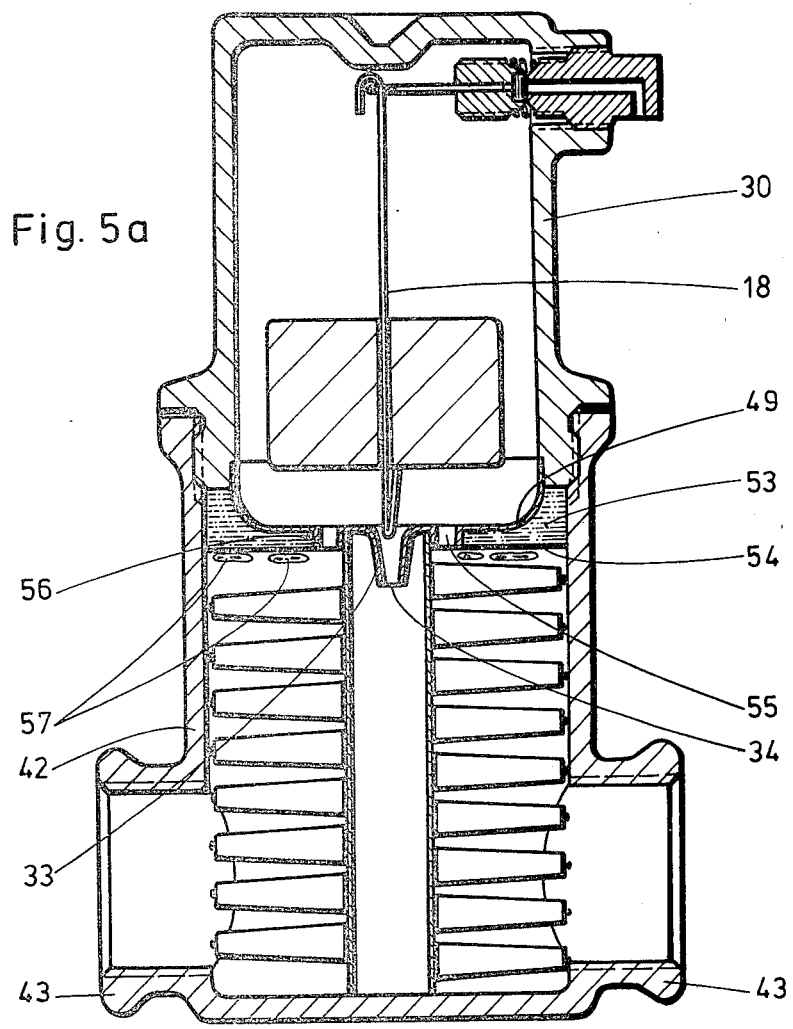
FIG. 5a is an embodiment slightly modified with respect to FIG. 4 of both the top part and of the cap shown as a cross-section by reference to the example of a "Spirovent"

FIG. 5a shows another "Spirovent" embodiment in which the top part is constructed in accordance with FIGS. 3 and 2; the cap 49 is formed substantially in accordance with FIG. 4 but with the difference that the connecting apertures comprise a plurality of circular open apertures 55 which are uniformly distributed on a concentric circle and each is surrounded by a corresponding deep-drawn deformation of the cap 49 by a collar 56 which is slightly lower than the collar 51 according to FIG. 4 with the consequence that the boundary layer 54 on which the bubbles 57 collect and travel to the open apertures 55, is slightly higher and the air chamber provided for dirt is therefore slightly smaller.

Figure 5B:
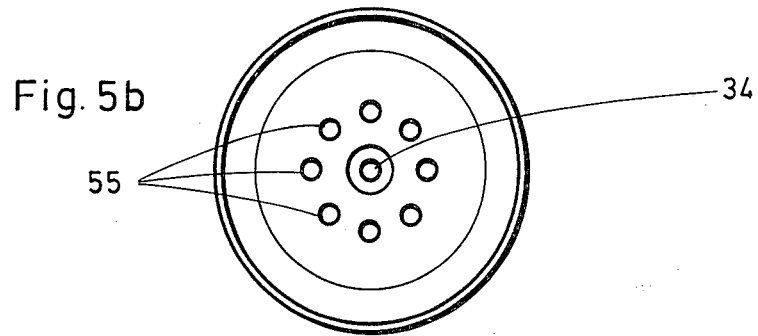
FIG. 5b shows the cap according to FIG. 5a to explain the shape and distribution of the open ports, as a plan view.

The arrangement of the open apertures 52 in relation to the aperture 34 of the indentation 33 can be seen by reference to FIG. 5b.

FIG. 6a shows another "Spirovent" embodiment in which the support member 42 adjacent to the "Spirorohr" 44, 45 is substantially constructed as in the embodiment according to FIGS. 3 and 5a. In the illustrated example the head part has the form shown in FIG. 4 and in this case, the valve needle 15 is also constructed so as to extend rectilinearly through a closed or open eyelet of the valve needle 18.

Figure 6B:
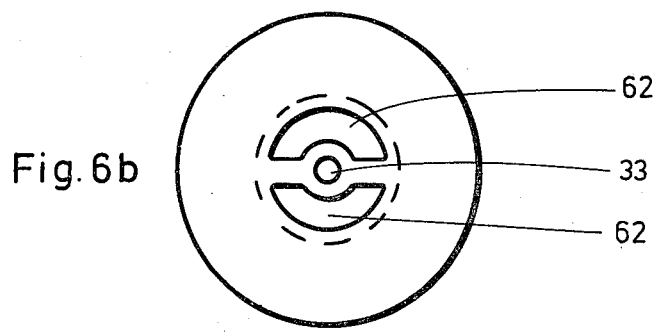
FIG. 6b is a view according to FIG. 5b with differently shaped open ports.
Figures 6C, 6D:
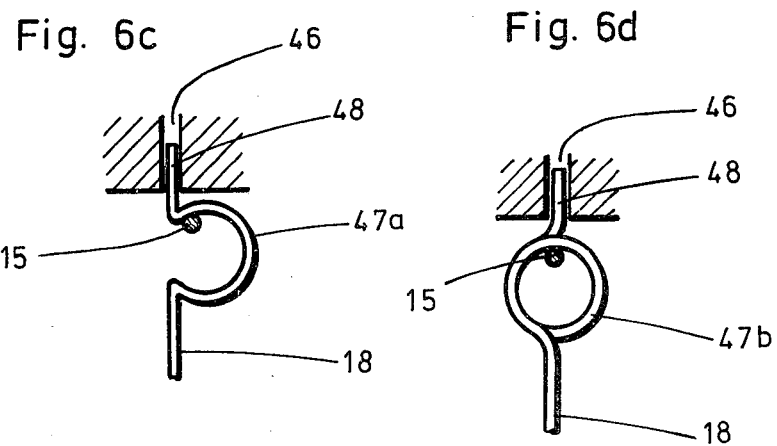
FIG. 6c shows the top end of the floating needle of the kind which can be used in the embodiment according to FIG. 4 or 6a and FIG. 6d is a modification of the float needle, surrounding the valve needle, and by contrast to the embodiment according to FIG. 6c being embodied in enclosed, eyelet-like configuration.

Two possibilities of shaping the eyelet for the float needle 18 are illustrated in FIGS. 6c and 6d. The open construction of the eyelet 47a is disclosed by the side view according to FIG. 6c while the side view according to FIG. 6d shows a closed embodiment of the eyelet 47b. This can simply be produced by the end of the float needle 18 being bent in the manner of an individual turn and with due reference to the desired eyelet diameter through 360°, perpendicularly to the needle axis but in a plane containing the latter. The remaining free end is constructed as a free end which is guided by the top part of the head member lid, as indicated in FIGS. 6c and 6d. Both pilot embodiments permit the elimination of the top float needle stop abutment 24a which the needles themselves form if a suitable diameter is selected, so that in its top position the float 21 bears on the bottom eyelet edge and thus comes to a stop below the valve member so that no mechanical stresses are applied by the float 21 on the valve or its member.

The cap 58 of this exemplified embodiment is not downwardly curved into the support member as in the previous examples but is of flat construction with the particular purpose of providing a non-return valve. To this end, the indentation 33 is closed at the bottom so that it merely forms the retaining and guiding function for the bottom float needle point; on the other hand, the float 21 is provided on its underside with correspondingly constructed ring seals 59 which ensure that when the float is in the position in which it bears on the cap 58, the support member chamber is hermetically sealed from the top member chamber.

This embodiment is particularly suitable for circuits with unsaturated, absorbing liquids, since the free water surface area must be kept at a minimum, so that the air or gas chamber to be maintained above the liquid level which supports the float 21 does not disappear as a result of the gas or air absorption process in the apparatus itself. Irrespective of the pressure and therefore irrespective of the prevailing position of the float air absorption is minimized by adopting correspondingly small dimensions for the gap 61 between the float and the wall of the head member; when used as safety device against water shortfall ("Spirotop") the opening reaction of the valve is faster and more exact the smaller the water volume around the float 21.

As can be seen by reference to FIG. 6b, the open apertures take the shape of two oppositely disposed recesses or deep-drawn open apertures of semicircular or crescent shape, arranged concentrically around the indentation 33. The shape and position of the ring seals is adapted to the arrangement and relative coordination of the said apertures.

As already mentioned, each top member according to the invention can be used for a "Spirovent" as well as for a "Spirotop". In the top member illustrated in FIG. 6a with the special construction of the cap 58 in the form of an enclosed indentation 33, the float 21 and cap 58 co-operate as a non-return valve in the sense that in the bottom position the cap hermetically seals both chambers against each other so that in the event of a pressure loss and an open valve no air or ambient atmosphere is able to enter the circuit from the top part and unintentional venting is thus prevented. The non-return valve action is not provided with an open indentation 33, because in that case gas can pass through the central bore from the top part into the support part, irrespective of whether this is of cup shape construction for the "Spirotop" according to FIG. 2 or whether it is provided with a "Spirorohr" for the spirovent, since the central bore must be greater than the diameter of the needle 18 owing to the need for the float 21 to move freely upon the needle 18.

The description of the preferred exemplified embodiments shows particularly clearly the advantageous manner in which the individual component parts of the apparatus can be combined with each other and can be shaped depending on the circuit parameters and properties of the liquids. In particular, each top part can be screwmounted upon a support part either as an absorption degasser, for example in accordance with FIG. 6a ("Spirovent") or on to a support part according to FIG. 2 ("Spirotop").

I claim:

1. Apparatus for venting and/or degassing such as the absorption degassing of a pipeline system including a liquid circuit, in particular a water circuit, comprising an upwardly extending casing having an upper end and a lower end, a valve mounted in said casing adjacent the upper end thereof with said valve communicating between the interior and exterior of said casing, a valve needle mounted in said valve and extending into said casing adjacent the upper end thereof, said valve needle extending transversely of the upward direction of said casing, an upwardly extending float needle located within said casing and disposed in contacting engagement with said valve needle, a float suspended on and movable in the upward direction on said float needle, wherein the improvement comprises that said casing comprises an upwardly extending top part forming the upper end of said casing and a bottom part extending downwardly from the lower end of said top part, said top part containing said valve float needle and float, a cap extending transversely of the upward direction of said casing in the region of the lower end of said top part, said cap having at least one opening therethrough affording communication between the interior of said bottom part and top part, said float needle extending upwardly from the region of said cap to said valve needle, and said top part and float needle being dimensioned so that said float moves upwardly and downwardly freely on said float needle from the region of said cap toward said valve needle so that during a pressure increase within said casing up to a predetermined value an accurate safety distance is maintained between the liquid surface in said casing and said valve, and said valve having a labyrinth outlet port for preventing valve damage or contamination from the exterior of said casing.

2. Apparatus according to claim 1, characterised in that the safety distance is designed for a desired pressure increase to 6 bar.

3. Apparatus according to claim 2, characterised in that the valve needle (15) and the float needle (18) are interconnected at their ends by means of interengaging eyelets (17, 19).

4. Apparatus according to claim 3, characterised in that said valve needle extends horizontally and the eyelet (17) of the valve needle (15) extends in the horizontal plane of said valve needle and has the smallest possible diameter.

5. Apparatus according to claim 3, characterised in that the eyelet (19), provided at the top end of the float needle (18), is constructed in elongated form in the upward direction.

6. Apparatus according to claim 3, characterised in that the eyelet (39, 47a), provided at the top end of the float needle (18), is formed as an open hook and the upper end of said top part of the casing is provided with an inwardly directed central indentation (38), oriented towards the float needle (18) and functions as needle stop (FIGS. 2, 3, 5).

7. Apparatus according to claim 1 or 2, characterised by a stop abutment (20), at the bottom end of the float needle (18).

8. Apparatus according to claim 7, wherein said stop abutment comprises a bent portion on the lower end of said float needle.

9. Apparatus according to claim 8, characterised in that the bent portion (41) is constructed in acute angled form and resiliently as a self-arresting safety device through which the fload (21) passes from below, from only one side, during the assembly thereof.

10. Apparatus according to claim 1 or 2, characterised in that the casing (1) is provided with a bottom stop abutment and a top stop abutment (23, 24) for the float (21) (FIG. 1).

11. Apparatus according to claim 10, characterised in that said top stop abutment for the float (21) on the float needle (18) in the top region thereof.

12. Apparatus according to claim 11, characterised in that said valve needle and float needle each have and are interconnected by interengaging eyelets and the stop abutment is situated beneath the eyelet (19) of the float needle (18).

13. Apparatus according to claim 11, characterised in that the stop abutment (24a) comprises a float needle deformation, and said deformation comprises one of a lateral bulge and an offset portion.

14. Apparatus according to claim 1 or 2, characterised in that said valve includes a rotatable valve lid and a spring so that the closing force of the valve (8, 11, 12) can be steplessly adjusted by rotating said valve lid on said spring (14).

15. Apparatus according to claim 1, characterised by said top end of said float needle having one of a closed and open eyelet (47) with an extension (48) projecting upwardly from the eyelet (47) and the upper end of said top part forms a guide (46) for retaining said extension so that said extension is longitudinally movable in the top part but with a limited upward motion and said valve needle includes a rectilinearly horizontally extending section which extends through the float needle eye (FIGS. 4, 6).

16. Apparatus according to claim 15, characterised in that the eyelet (47b) extends substantially in a vertical plane, and is formed by a loop from a 360° turn of the float needle and the free end of the loop represents the longitudinally movably guided top extension (48) (FIG. 6d).

17. Apparatus according to claim 15, characterised in that the eyelet (47a) comprises a bow-shaped lateral bulge formed in the float needle (18) having an angular extent greater than semicircular and extending substantially vertically and the free float needle end extending upwardly from the bulge forms the longitudinally movably guided top extension (48) (FIG. 6c).

18. Apparatus according to claim 1, characterised in that said labyrinth port (27), comprises an elongated tubular port bent at a right angle, and extending through the valve member (8) from the inside to the outside of said casing.

19. Apparatus according to claim 1, characterised in that the float (21) is spaced inwardly from the internal wall of said casing so that a desired free water surface (25, 26) remains between the float (21) and the internal wall of the casing.

20. Apparatus according to claim 1, characterised by a gas and liquid-tight screw connection between the bottom part (2; 31, 42) and the top part (5: 30).

21. Apparatus according to claim 20, characterised in that the bottom part (31) includes a connecting member in the form of a circuit connection while the top part (30) in its function as venting device supports the valve (8, 11, 12) and accommodates the float (21) with the fload needle (18).

22. Apparatus according to claim 21, characterised in that the circuit connection is provided as a vertical coaxial connecting socket in the lower end of said bottom part (31).

23. Apparatus according to claim 20, characterised in that the bottom part (42), functioning as connecting member and separator, is provided with at least two circuit connections (43) and one gas separating device and the top part (30) in its function as venting device supports the valve (8, 11, 12) and accommodates the float (21) with float needle (18).

24. Apparatus according to claim 23, characterised in that the gas separating device comprises a wire cage.

25. Apparatus according to claim 23 or 24, characterised by that said circuit connections comprises two connecting sockets (43) each having a horizontal axis and situated in alignment opposite each other on the same horizontal axis in the bottom region of the support member (31), said bottom part including a support tube (44) arranged coaxially with the upwardly extending axis of the casing (1) and a plurality of turns of a wire coil (45) in helical configuration wound on said support tube.

26. Apparatus according to claim 1, characterised in that the cap (32, 49, 59) is sealingly and nondetachably connected to the top part (30).

27. Apparatus according to claim 26, characterised in that the cap (32, 49, 58) has a central indentation (33) extending downwardly into the bottom part (31, 42) and is constructed as a guide for the bottom end of the float needle.

28. Apparatus according to claim 27, characterised in that the indentation (33) is constructed as an open port.

29. Apparatus according to claim 27, wherein a pair of said annular seal coverings are provided on the bottom side of said float in concentric spaced relation.

30. Apparatus according to claims 26, 27 or 28, characterised by at least one connecting port concentrically arranged in the cap (32, 49).

31. Apparatus according to claim 30, characterised in that the at least one connecting port (52) surrounds the indentation (33).

32. Apparatus according to claim 30, characterised by said at least one connecting port comprises two semicircular or crescent-shaped, symmetrically disposed connecting ports (62).

33. Apparatus according to claim 30, characterised by said at least one connecting port comprises a plurality of connecting ports (45), arranged in uniform distribution on a concentric circle.

34. Apparatus according to claim 33, characterised in that the connecting ports (55) are deep-drawn so that each is surrounded by an edge or collar (56) which project downwardly into the bottom part (31, 42) when the cap is installed.

35. Apparatus according to claim 34, characterised in that in its installed state, the cap (32, 49) is downwardly curved in the bottom part (31, 42).

36. Apparatus according to claim 1, characterised by a flat construction of the cap (58).

37. Apparatus according to claim 36, characterised by an annular seal covering (59) of the bottom side of the float.

38. Apparatus according to claim 37 or 29, characterised in that the seal covering (59) comprises plastics ring seals.

39. Apparatus according to claim 1, characterized in that on its side directed toward the top part the cap is provided with a plurality of studs or beads on which the float can bear when it is in its bottom position.

* * * * *